US005213597A

United States Patent [19]

Campbell

[11] Patent Number: 5,213,597

[45] Date of Patent: May 25, 1993

[54] FILTRATION SYSTEM FOR BOTTLED WATER DISPENSER WITH CHECK VALVE

[76] Inventor: Gary J. Campbell, 6480 10th Ave., Blanchard, Mich. 49310

[21] Appl. No.: 816,213

[22] Filed: Jan. 3, 1992

[51] Int. Cl.[5] ........................ B01D 35/153; B67D 5/62

[52] U.S. Cl. ........................................ 55/385.1; 55/420; 55/490; 62/389; 141/18; 141/364; 222/185; 222/189; 248/311.3

[58] Field of Search ..................... 55/420, 385.12, 490; 62/389, 397; 222/129, 185, 189, 181; 141/18, 346, 363, 364, 365, 366; 248/311.3

[56] References Cited

U.S. PATENT DOCUMENTS 296,095 4/1884 Wisloh .................................. 62/397
778,012 12/1904 Conover .............................. 62/397
992,921 5/1911 Stevens ................................ 62/397
1,078,214 11/1913 Patnaude .............................. 62/397
1,692,066 11/1928 Washburne ........................... 62/397
3,974,863 8/1976 Frahm et al. ......................... 62/397
4,520,950 6/1985 Jeans ............................... 222/400.7
4,874,023 10/1989 Ulm .................................... 141/364
4,902,320 2/1990 Schroer et al. ....................... 55/420
4,923,091 5/1990 Sutera ................................ 222/185
4,928,856 5/1990 White .............................. 248/311.3
4,991,635 2/1991 Ulm .................................... 141/363
5,111,966 5/1992 Fridman ............................. 222/185
5,121,778 6/1992 Baker et al. ........................... 141/18

*Primary Examiner*—Joseph W. Drodge
*Attorney, Agent, or Firm*—Price, Heneveld, Cooper, DeWitt & Litton

[57] ABSTRACT

An air filter assembly for a water supply bottle used with a bottle water dispenser. The air filter has a tubular member for attachment to the neck of the water bottle. A breather tube is attached to the side of the tubular member and an air filter is attached to the breather tube. When the water bottle is inverted into a reservoir in a bottled water dispenser, the water drains from the supply bottle until the end of the tubular member is immersed in the water and the partial vacuum in the supply bottle prevents any further water flow. The water in the reservoir can rise and submerge the breather tube connection point to the tubular member. When the water in the reservoir drops below the connection point air will pass through the filter into the bottle to release more water. A check valve can be used in the breather tube to prevent the entry of air into the water supply bottle if the air filter on the breather tube is removed. The air filter assembly can be attached to the neck of the water supply bottle or it can be mounted in the reservoir so the water supply bottle can be connected when inverted or placed in the bottle stand.

14 Claims, 2 Drawing Sheets

FILTRATION SYSTEM FOR BOTTLED WATER DISPENSER WITH CHECK VALVE

BACKGROUND OF THE INVENTION

Bottled water dispensers are frequently used in manufacturing plants and chemical factories to provide a supply of water convenient to the area where the employees are working. In many work areas, the air is contaminated with dust from the materials being worked upon. In chemical plants, the air is often contaminated by solvents and dust from solid materials being used in chemical processes and from finished product. The bottled water dispenser stands surrounded by this environment. When an employee takes a drink from the bottled water dispenser, the water pours from a reservoir into the cup or container held in the hand of the employee. As we are all familiar, air must enter the water supply bottle to relieve the partial vacuum in order for the water to empty from the bottle. The air frequently bubbles in an erupting stream of large and small bubbles which carry with them all of the contaminants in the ambient air surrounding a water cooler. As successive employees draw water from the dispenser, the air continues to bubble into the supply bottle further contaminating the water as well as the water in the reservoir in the water dispenser. In order to avoid this health hazard, it would be desirable if the water in the water supply bottle could be protected from contamination as it empties and is displaced by the necessary air. Also, it would be convenient if this could be done using conventional water bottles which are not modified in any way.

SUMMARY OF THE INVENTION

In accordance with the present invention, an air filter assembly is provided for the water supply bottle used in a bottled water dispenser. The filter assembly attaches to the neck of the water supply bottle. The filter assembly has a breather tube fastened at a medial point along the side of the assembly. An air filter is attached to the breather tube. When the water supply bottle is inserted into the dispenser, the water will rise to the level of the breather tube connection, inserting the lower portion of the assembly in the water in the reservoir in the dispenser. As water is drawn from the dispenser, air will enter the water supply bottle through the air filter and breather tube, protecting the water from contamination.

In a second embodiment of the air filter assembly, a check valve is installed in the assembly to allow the water to flow from the bottle while preventing air from entering through the check valve.

In another embodiment of the invention, two check valves are employed, one to enable water to drain from the bottle while preventing air entering, and a second in the breather tube to enable the filter cartridge to be replaced without allowing air to enter the bottle through the breather tube.

In yet another embodiment of the invention a disposable air filter assembly is provided.

DETAILED DESCRIPTION OF THE PREFERRED EMBODIMENTS

Figure 1:
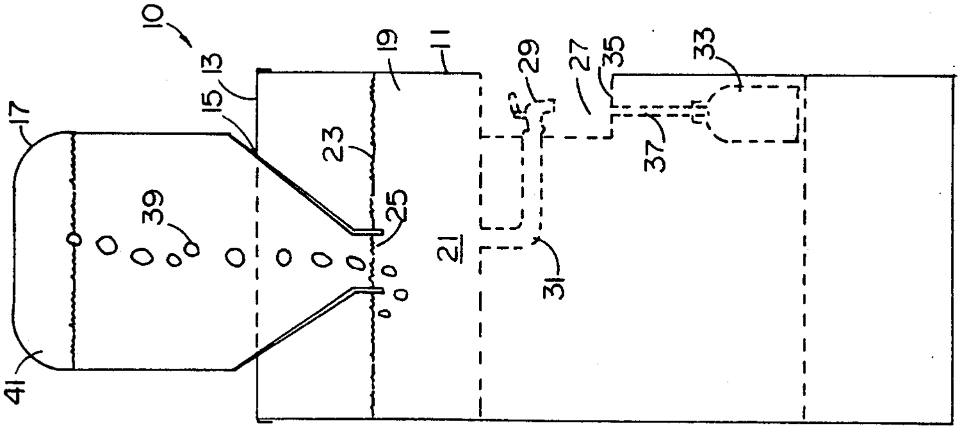
FIG. 1 is a schematic representation of a bottled water dispenser with a water supply bottle in place.

Referring to FIG. 1, a conventional bottled water dispenser is shown and indicated generally by the number 10. The dispenser has a floor mounted stand 11 which has a top surface 13 with an aperture 15 therein for supporting an inverted water supply bottle 17. Within the upper portion of the bottled water dispenser is a reservoir 19 containing sufficient water 21 so that the surface 23 of the water rises and covers the open mouth 25 of the water supply bottle.

The water dispenser has a recess area 27 usually on the face of the dispenser in which is mounted a valve 29 for draining water through pipe 31 which is connected to the bottom of reservoir 19. Since bottled water dispensers are usually positioned in remote areas in a plant or factory, there is no plumbing or drain plumbing. In order to catch any water which might spill over out of a cup or which might drip from valve 29, a sump 33 is provided which connects to a drain 35 in the bottom of recess portion 27 by a tube 37.

Bottled water dispenser 10 is a free-standing unit which can be positioned anywhere in the plant or factory convenient to the employees to provide drinking water. The bottled water is usually supplied in large 5 gallon glass or plastic bottles which are sealed and carried in wooden or plastic frames. When it is necessary to add a bottle of water to the dispenser, a cover is removed and the bottle is quickly inverted into aperture 15 in the top plate 13 of the dispenser. When the bottle is inverted, a portion of the water will drain into reservoir 19 and will rise to level 23 which is above the open mouth of the supply bottle. In order for the water to drain from bottle 17, air, usually in the form of a stream of large and small bubbles 39, must rise to the dead space 41 inside the bottom of the inverted water supply bottle.

As water is drained from reservoir 19, water level 23 will lower enabling air to enter into the open neck of the water supply bottle to relieve the partial vacuum in dead space 41 to enable more water to drain from the bottle to restore water surface 23 to the point where it again immerses the open mouth of the water supply bottle. When the water rises to this point, no more water will drain from the bottle.

As discussed previously, in the operation of a bottled water dispenser, the air needed to displace the water drained from the bottle enters from the ambient atmosphere surrounding the bottled water dispenser. This air can be heavily contaminated with dust, chemicals, even chemicals which dissolve in the water contained in the water supply bottle. While the bottled water dispenser provides water to quench the thirst of the employees, it can be, at the same time, a severe threat to the health of the same people in view of the harmful materials which can be drawn into and concentrated in the water supply bottle and reservoir.

Figure 2:
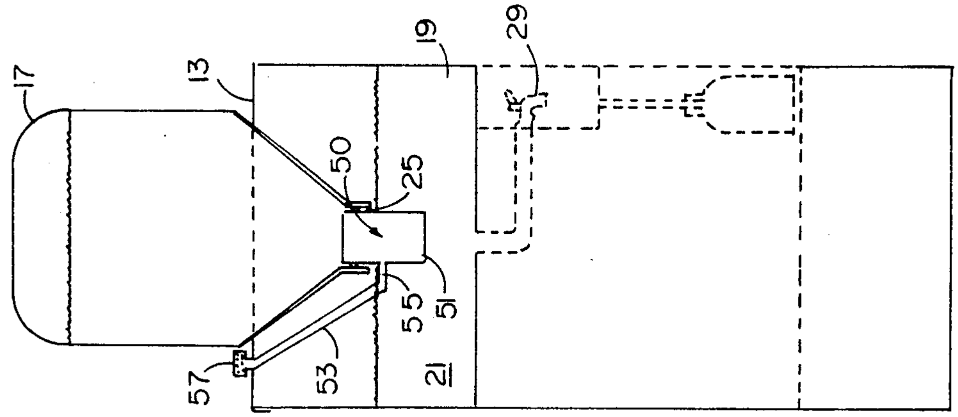
FIG. 2 is a schematic representation of a bottled water dispenser with an air filter assembly attached to the neck of the water supply bottle.

In FIG. 2 a bottled water dispenser, similar to the dispenser of FIG. 1, is shown and, therefore, the several pieces making u the dispenser will only be numbered when necessary for description of the structure shown. In FIG. 2, a water supply bottle 17 is shown which has drained water 21 into the reservoir 19. An air filter assembly, indicated generally by the number 50, is shown mounted in neck 25 of the water supply bottle. The air filter assembly has an elongated tube portion 51 which depends down into the reservoir of the bottled water dispenser. A breather tube 53 is attached to the side of water conduit 51 at medial point 55. An air filter 57 is attached to the end of breather tube 53. As shown in FIG. 2, it can be seen that the water in the reservoir has risen to a level slightly above or at point 55 where the breather tube enters the side of water conduit or delivery tube 51. As water is now drained from reservoir 19 through valve 29, the water level will begin to decrease or lower in the reservoir. As the water level passes point 55 where breather tube 53 is attached, air will now pass through air filter 57, down breather tube 53, and into water conduit 51 and then pass upwardly into bottle 17 to displace the water drained from the bottle.

Breather tube 53 and attached air filter 57 can be mounted inside the stand of the bottled water dispenser, or breather tube 53 can extend out through top surface 13. The air filter should be selected which is effective in removing the contaminant materials in the ambient air surrounding the bottled water dispenser. Coarse filter paper can be used for harmless dust. Filter paper and charcoal, preferably activated charcoal, can be used for removing organic contaminants such as solvent materials. If biological contaminants are present in the ambient air, suitable microfilter materials can be used in air filter 57 to remove such materials and to prevent them from entering water supply bottle 17. The filters can be assembled to be as simple or complex as the contamination presented with single or multiple layers of different filter materials being used to fit the particular hazardous situation which must be compensated for. The filter materials are preferably supplied in a disposable cartridge which can be attached to breather tube 53.

Figure 3:
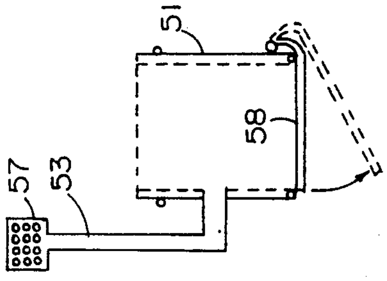
FIG. 3 is a schematic representation of an improved air filter assembly incorporating a check valve.

In operation of the air filter assembly shown in FIG. 2, the water will drain from bottle 17 and from reservoir 19 in a conventional manner after the water level in the bottle has passed breather tube connection point 55. While there is only a small amount of water remaining when this water drains out, reservoir 19 will begin to drain. In order to provide an indication that bottle 17 is substantially empty and that the water level in the filter assembly is below breather tube connection point 55, it is preferred to use an air filter assembly, such as that shown schematically in FIG. 3, with the addition of a check valve 58. In FIG. 3, the check valve is shown as a simple flap-type valve which will allow water to drain from water supply bottle 17 but will not allow air to enter the water supply bottle.

Another important advantage in using the check valve in the air filter assembly is that it protects the water in the bottle, particularly if air filter element 57 becomes plugged, so that it no longer will pass air into the bottle. A person attempting to use the water bottle with the plugged air filter will be able to drain water from the reservoir but not from bottle 17. When the reservoir is empty, the person seeking a drink will activate valve 29 and while bottle 17 can be seen to contain water, the water will not drain from the bottle. This puts the person on notice that the air filter assembly is blocked and that filter element or filter cartridge 57 should be replaced.

The filter cartridge can be replaced by pinching breather tube 53 adjacent the cartridge to prevent a rapid influx of unfiltered air into water supply bottle 17. With breather tube 53 pinched closed, filter cartridge 57 can be disconnected from tube 53 and a fresh cartridge can be inserted. After the cartridge is attached to tube 53 and is properly seated, the person can release tube 53 and clean filtered air will be drawn through the breather tube and into water supply bottle 17 enabling water to now drain from the bottle and refill the reservoir in the bottled water dispenser.

It should be pointed out that in the drawings reservoir 19 is shown as a relatively large tank. The size the reservoir can be controlled so that only a small amount of of water is contained therein at any one time. This is particularly important when air filter 57 is plugged and the reservoir will empty.

Figure 4:
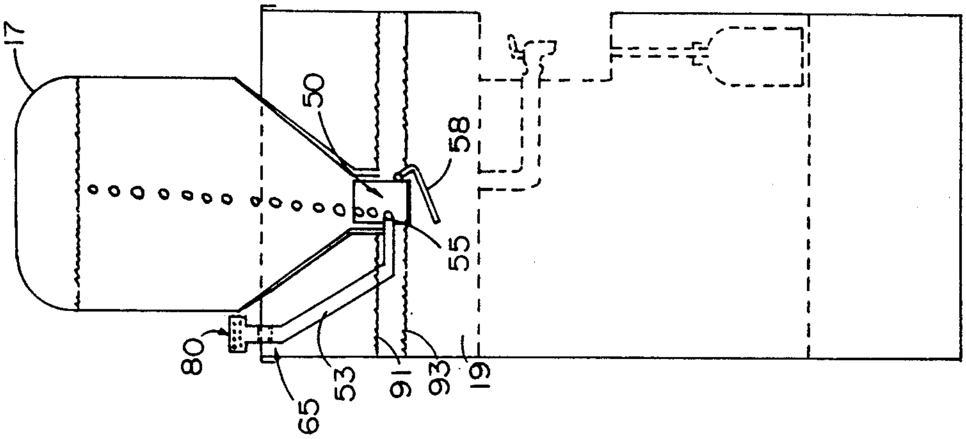
FIG. 4 is a schematic representation of a bottled water dispenser employing an air filter assembly equipped with a first check valve at the neck of the supply bottle for preventing air from entering the bottle through the neck, and a second check valve in the breather tube extending to the air filter.
Figure 5:
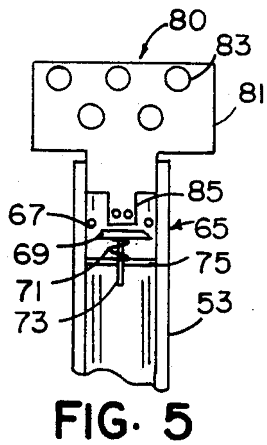
FIG. 5 is an expanded view of a portion of the end of the breather tube with the check valve and air filter assembly in place.

In the bottled water dispenser shown in FIGS. 4 and 5, breather tube 53 has a check valve 65 recessed in the end of the breather tube. The check valve has a seat 67 against which closure member 69 is normally biased by a spring 71. A guide 73 is provided for the closure member to keep it in position in the breather tube. A plate 75 is provided at the bottom of the check valve to support bias spring 71. The bottom plate is perforated so that air can pass freely through the check valve. An air filter assembly, indicated generally by the number 80, has a cartridge 81 for containing the filter media 83. The cartridge has a depending portion 85 which is used to push closure member 69 away from valve seat 67 to open the check valve. When air filter cartridge 80 becomes plugged, it can be withdrawn from the breather tube which causes spring biased closure member 69 to be pressed against valve seat 67, preventing any air from entering breather tube 53 while the air filter cartridge is removed and replaced by a clean cartridge.

As can be seen in FIG. 4, the air filter assembly used with bottle 17 has a check valve 58 attached at the neck of bottle 17 and a check valve 65 and an air filter cartridge 80 in the end of breather tube 53. Two check valve assemblies are used in the air filter assembly.

It is interesting to observe the affect of the change in depth of the water in reservoir 19 (FIG. 4). When the water is at level 91 it is above connection point 55 for breather tube 53. At this level air will not tend to be drawn through filter 80 in breather tube 53. When the water drops to level 93 it passes below connection point 55 and air will tend to be smoothly drawn through the filter element into water supply bottle 17. Water level 93 is still above the open end of filter assembly 50 so the water will not enter through the opening of the filter assembly. If filter cartridge 80 becomes plugged, no air will enter the bottle and check valve 58, which is normally in the closed position, will prevent any air from entering through the water conduit and through the opening closed by check valve 58. It is important, and certainly preferable, that a reasonable space be provided between connection point 55 and the opening at the end of the filter assembly. For example, if an inch or two of space is provided, then the water level can move below connection point 55 to allow air to enter through breather tube 53 with no danger of unfiltered air being taken in through the open end of the filter assembly. It should be remembered that the end of the filter assembly is only opened when water is coming out of water storage bottle 17. At other times, check valve 58 closes the water conduit protecting the water in the water storage bottle.

Air filter assembly 50 of FIGS. 2–5 can be made of plastic which can be either rigid or flexible. It can also be assembled so that it is inserted into the neck of the water supply bottle or it can be made to telescope over the neck on the outside of the neck of the water supply bottle.

The check valves used with the air filter assembly can be obtained from many commercial suppliers. The Watts Regulator Company of Andover, Massachusetts provides a type FK slide-in plastic check valve which is particularly suitable for check valve 58. That company also supplies a type WM slide-in plastic check valve which is particularly suitable for check valve 65. Water conduit portion 51 of the air filter assembly can also be of rigid plastic material such as polyvinyl chloride pipe. If a rigid plastic tube is used, then suitable sealing members such as O-rings or washers should be provided on the inside or outer surface of the tube for connection to the rigid glass or plastic neck of the water supply bottle. The air breather tube can be made of flexible or rigid plastic tubing. Flexible tubing is preferred in view of its durability and ease of handling without fear of breaking.

In using the air filter assembly of FIGS. 2–5, the water supply bottle would be opened, for example, while still in its plastic or wooden frame and the air filter assembly would be plugged into the neck of the bottle or slipped over the neck of the bottle. The water bottle could then be lifted with the breather tube and air filter trailing down along the side of the bottle. The breather tube and filter assembly can be held by the fingers while the bottle is quickly inverted to drain water into the reservoir. As the bottle is lowered quickly into place, the air filter and breathing tube can be positioned so that they are not obstructed by the edge of aperture 15 in top plate 13 of the bottled water dispenser.

Figure 6:
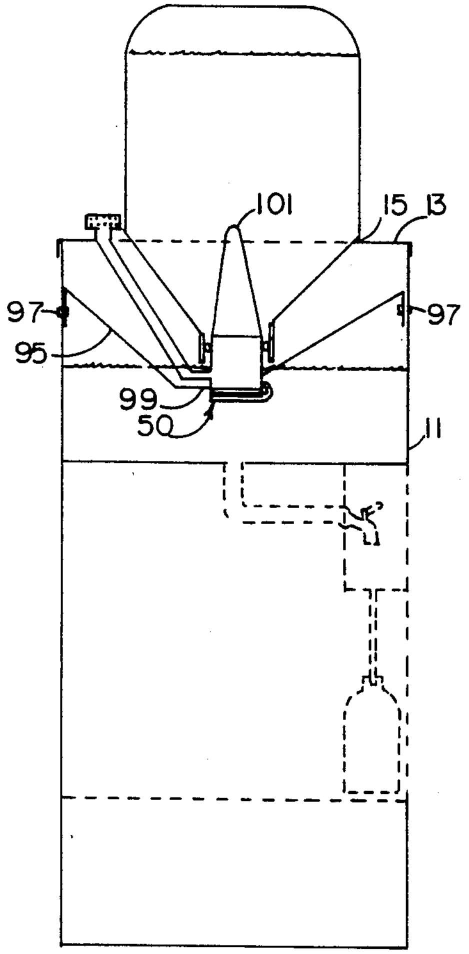
FIG. 6 is a schematic view of an air filter assembly suspended from the sides of the bottled water dispenser.

It is also within the scope of the present invention to have the air filter assembly permanently attached to the bottled water dispenser so that the water bottles can merely be opened and turned into the open top of the dispenser to connect the air filter assembly. As shown in FIG. 6, air filter assembly 50 is supported in a metal bridge 95 which is attached to the front and back sides of stand 11 for the bottled water dispenser. Suitable fastening means 97, such as pop rivets, sheet metal screws and bolts and nuts can be used to support the frame. Air filter assembly 50 is then inserted through an aperture 99 in the metal frame and extends upwardly toward the aperture 15 in top plate 13 of the bottled water dispenser. A metal wire frame 101 is provided as a guide for the water bottle. Wire frame 101 is essentially cone-shaped and enables the person inserting the water bottle to merely turn the bottle and place the neck over the wire cone. The bottle can then be quickly slid downwardly to connect the neck of the bottle to the air filter assembly. By using the wire cone, the bottle will be quickly positioned and there is no danger to the person of pinching a finger between the heavy water supply bottle and the air filter assembly. The hands can be kept well clear of the neck of the bottle with the wire cone acting as the guide.

Figure 7:
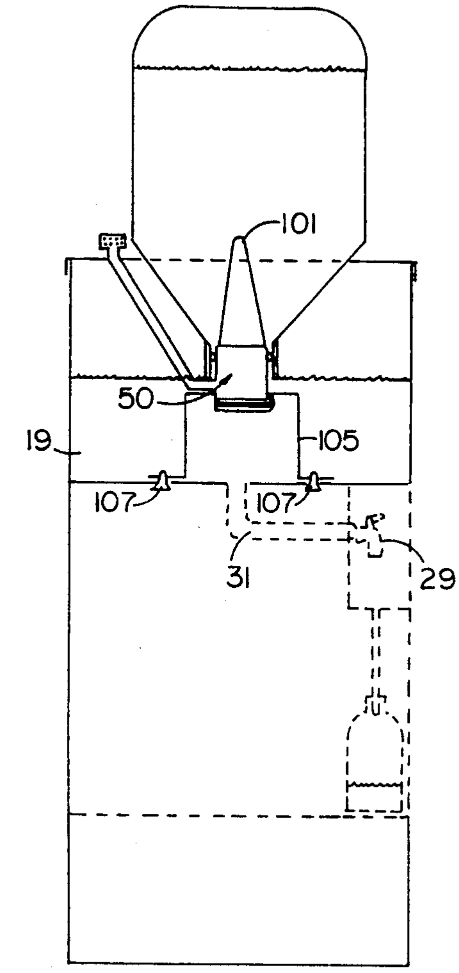
FIG. 7 is a schematic view of a bottled water dispenser having the air filter assembly supported on a stand which is attached to the bottom of the water reservoir in the dispenser.

In FIG. 7, air filter assembly 50 is supported on the top of an inverted open box-like frame 105 which is fastened to the bottom of reservoir 19 by suitable fastening means 107. Water can freely flow from the reservoir through the open stand and out tube 31 to valve 29. Frame 105 can be made of metal, such as aluminum or stainless steel, which are suitable for use in food handling. The dimensions of the box can be proportioned to the shape of the water supply bottle so that the entire weight of the bottle does not repose on the air filter assembly and on box 105. The box frame can be positioned low enough so that the water bottle can be inverted over cone 101 and slid downwardly into or over the air filter assembly with sufficient leeway so that the weight of the water supply bottle is supported by top surface 13 of the bottled water dispenser.

Figure 8:
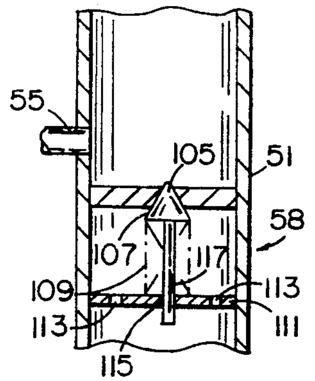
FIG. 8 is a sectional view of a check valve assembly for use in the air filter assembly.

In FIGS. 3–7, a flap-type check valve has been schematically illustrated for closing the end of the water delivery conduit. Referring to FIG. 8, a typical commercial check valve 58 is shown positioned inside water delivery conduit 51. The check valve has a closure member 105 which contacts valve seat 107. Closure member 105 is normally biased by a coil spring 109 to the normally upward or closed position to prevent any air from entering through the open end of tube 51. The weight of the water and the pressure of the water flowing out through water delivery conduit 51 is sufficient to overcome the pressure of spring 109 to force sealing member 105 away from valve seat 107 to enable the water to flow through the check valve. A plate 111 is provided with a plurality of spaced apertures 113 through which the water can flow. Centrally disposed in plate 111 is an aperture 115 for guide member 117. Aperture 115 enables closure member 105 and guide member 117 to move up and down under the influence of the flowing water while being accurately returned to valve seat 107 after each displacement.

Figure 9:
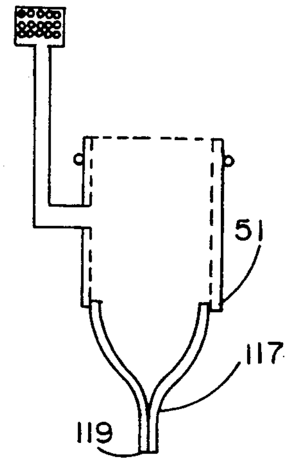
FIG. 9 is a schematic view of an air filter assembly employing a flexible check valve.

In FIG. 9, a substantially simplified check valve is shown in the form of a plastic or rubber duckbilled check valve 117. The duckbilled check valve would again fit in or over the end of water delivery conduit 51. Check valve 117 has a pair of flattened depending portions which are separated by a thin slit 119. Water flowing through water conduit 51 can push open slit 119 and enable the water to freely flow into the reservoir in the bottled water dispenser stand. Air, on the other hand, would be prevented from entering the water supply bottle because slit 119 is normally closed and would provide sufficient resistance to prevent air entering through that passage. The latter check valve is particularly useful with disposable air filter assemblies. The latter type are particularly useful in areas of high contamination where a new filter can be used each time a new water bottle is to be added to the bottled water dispenser.

From the above description it can be seen that a simple but very effective means is provided for protecting users of bottled water dispensers from the unnecessary health risk caused by the accumulation and solution of contaminants in the water stored in the water supply bottle.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. An air filter assembly constructed and arranged for attachment to a water supply bottle used in a bottled water dispenser, said water supply bottle having a container portion and a neck portion including a mouth through which water can exit the supply bottle comprising:

delivery means arranged for connection to the mouth of said water supply bottle;

a check valve means on said delivery means for supplying water from said bottle and for preventing unfiltered air from entering said bottle; and air filter means connected to said delivery means for allowing filtered air to enter through said delivery means into the mouth of said water supply bottle as water leaves said supply bottle through said delivery means.

2. An air filter assembly constructed and arranged for attachment to a water supply bottle used in a bottled water dispenser, said water supply bottle having a container portion and a neck portion including a mouth through which water can exit the supply bottle comprising:

fastening means for attaching said air filter to the mouth of the water supply bottle, said fastening means including a fluid passage for water to exit said water supply bottle and through which air can enter said water supply bottle;

check valve means in one end of said fastening means for preventing unfiltered air from entering said water supply bottle while enabling water to flow out of said water supply bottle through said fastening means; and filter means connected to said fastening means for allowing filtered air to enter the mouth of said water supply bottle.

3. An air filter assembly configured and arranged for attachment to a water supply bottle in a bottled water dispenser, said water supply bottle having a container portion and a neck portion including a mouth through which water can exit the supply bottle comprising:

delivery means arranged for connection to the mouth of the water supply bottle;

a check valve means on said delivery means for enabling water to flow from the mouth of the water supply bottle through said delivery means while preventing unfiltered air from entering the water supply bottle through said delivery means; and an air filter means coupled to said delivery means for filtering air entering said water supply bottle;

4. An air filter assembly for a water supply bottle as set forth in claim 3, wherein said first check valve means is a normally closed slit in a portion of said delivery means.

5. An air filter assembly for a water supply bottle as set forth in claim 3, wherein said check valve means is a duckbill check valve.

6. A water storage bottle for a bottled water dispenser comprising:

a bottle-shaped container having a neck portion including a mouth portion;

an air filter assembly for attachment to said mouth portion of said bottle-shaped container, said air filter assembly including:

a conduit member attached to the mouth portion of said container;

a check valve on said conduit member, said check valve arranged for allowing water to exit said mouth portion of said container while precluding unfiltered air from entering said container; and an air filter means connected to said conduit member for allowing filtered air to enter said container.

7. A bottled water dispenser comprising:

a supporting housing;

a reservoir in the top of said supporting housing, said reservoir having an open top constructed and arranged for receiving an inverted water supply bottle, said water supply bottle having a container portion and a neck portion including a mouth through which water can exit the supply bottle;

an air filter assembly constructed and arranged for attachment to the mouth of the water supply bottle, said air filter assembly including a water delivery conduit through which water can flow as it exits the mouth of a water supply bottle and flows into said reservoir;

a check valve on said water delivery conduit, said check valve arranged for enabling water to drain from the attached water supply bottle while preventing unfiltered air from entering the water supply bottle; and an air filter means connected to said water delivery conduit for supplying filtered air to the mouth of the water supply bottle attached to said water delivery conduit.

8. A bottled water dispenser as set forth in claim 7 wherein said air filter is connected to said water delivery conduit between the mouth of the water supply bottle and said check valve.

9. A bottled water dispenser comprising:

a support stand constructed and arranged for supporting a water supply bottle, said water supply bottle having a container portion and a neck portion including a mouth through which water can exit the supply bottle;

a reservoir mounted in said support stand for containing a supply of water from the water supply bottle;

an air filter assembly in said reservoir for connecting to the mouth of the water supply bottle, said air filter assembly comprising:

a delivery conduit, said delivery conduit having a first end arranged for connection to the mouth of the water supply bottle and a second end arranged for delivering water to said reservoir; a valve attached to said second end of the conduit arranged for dispensing water from said reservoir while preventing unfiltered air from entering said bottle and an air filter means connected to said delivery conduit for supplying filtered air to the water supply bottle, said air filter being connected to said conduit between the first and second ends of said conduit.

10. A bottled water dispenser as set forth in claim 9, including a stand for said air filter assembly in said reservoir, said second stand being supported on the bottom of said reservoir and being upstanding therefrom.

11. A bottled water dispenser as set forth in claim 9 wherein said air filter assembly is supported from said support stand and depends into said reservoir.

12. A bottled water dispensed as set forth in claim 9, wherein said air filter assembly includes an upstanding bottle guide for assisting in positioning the neck of the water bottle on said air filter assembly.

13. A bottled water dispenser as set forth in claim 9, wherein said bottle guide is a wire frame for insertion into the mouth of the water supply bottle.

14. A bottled water dispenser as set forth in claim 13, wherein said wire frame is substantially cone-shaped.

* * * * *

UNITED STATES PATENT AND TRADEMARK OFFICE

CERTIFICATE OF CORRECTION

PATENT NO. : 5,213,597

DATED : May 25, 1993

INVENTOR(S) : Gary J. Campbell

It is certified that error appears in the above-indentified patent and that said Letters Patent is hereby corrected as shown below:

Column 3, line 15, "u" should be --up--.

Column 9, claim 12, line 7, "dispensed" should be --dispenser--.

Signed and Sealed this

Thirty-first Day of May, 1994

Attest:

BRUCE LEHMAN

*Attesting Officer*

*Commissioner of Patents and Trademarks*